United States Patent Office 2,753,925
Patented July 10, 1956

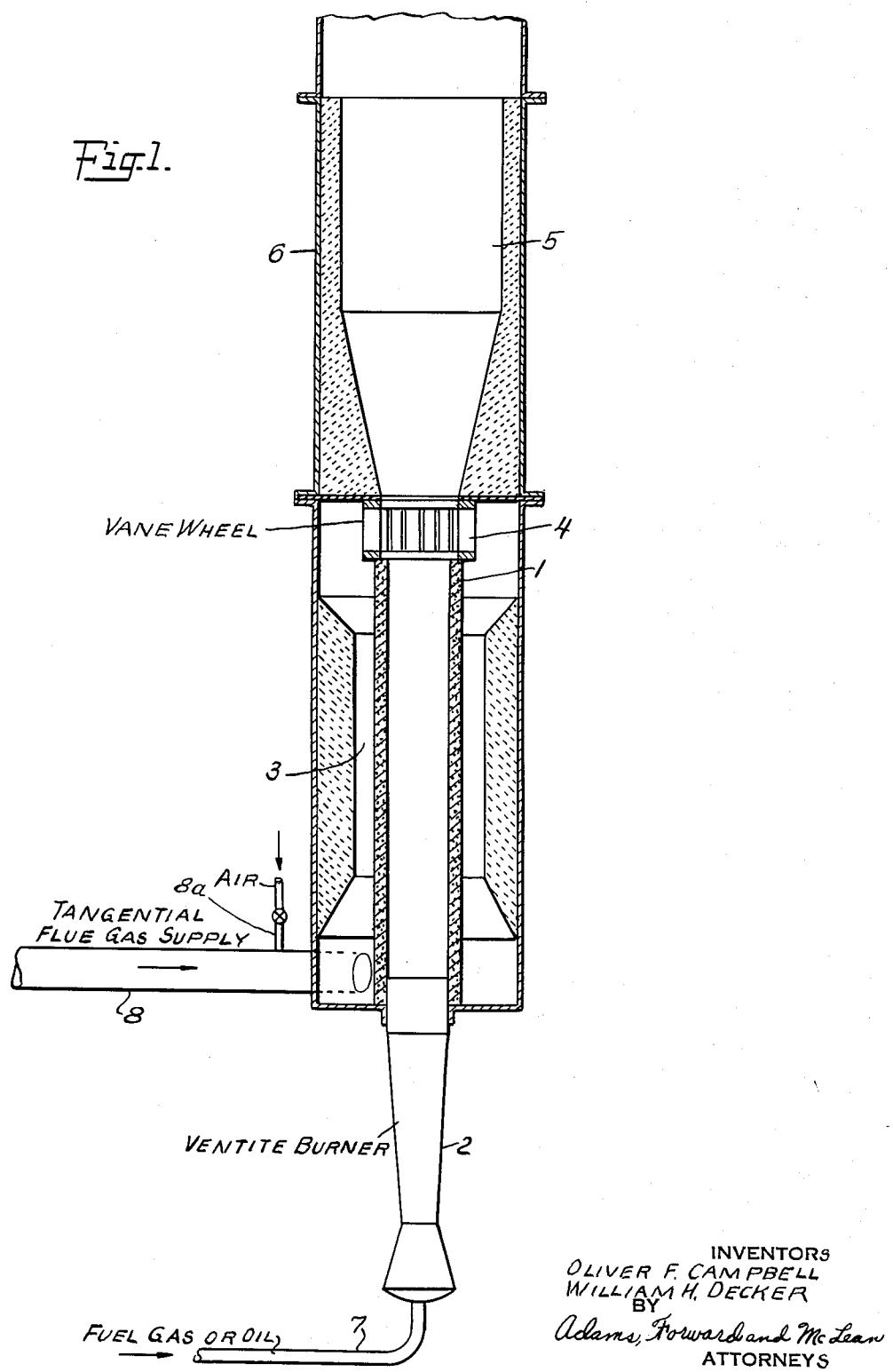

2,753,925

CARBON MONOXIDE BURNER

Oliver F. Campbell and William H. Decker, Whiting, Ind., assignors to Sinclair Refining Company, New York, N. Y., a corporation of Maine Application July 5, 1951, Serial No. 235,183

3 Claims. (Cl. 158—1)

Our invention relates in its broader aspects to the recovery of waste high temperature heat from the dilute concentrations of carbon monoxide in flue gases vented from catalyst regeneration systems of catalytic hydrocarbon conversion units. In a more particular aspect it relates to apparatus for effecting complete combustion of low concentrations of carbon monoxide in otherwise inert flue gas mixtures. By low concentrations we mean amounts corresponding to only about 5 to 15 B. t. u. per cubic foot in terms of thermal values.

Catalytic cracking operations result in an enormous production of waste flue gas, which is ordinarily released to the atmosphere, because of the large scale in which catalytic cracking operations are conducted and because of the fact that cracking operations produce several weight per cent of coke based on the charge which must be removed from the spent catalyst leaving the cracking zone by combustion with an oxygen containing gas in a regeneration zone. Regeneration operations are ordinarily conducted at about 1050° to 1250° F. and the flue gases are usually passed through a waste heat boiler to recover heat in the form of steam before being vented to the atmosphere. In order to control temperature in the regeneration zone and in order to provide maximum coke burning capacity for the cubic feet of air or other regeneration gas available, complete combustion of coke to carbon dioxide is avoided and as low a ratio of carbon dioxide to carbon monoxide as is practical is obtained while insuring adequate stripping of coke from the catalyst. Carbon monoxide, of course, represents a potential hazard from the standpoint of atmospheric pollution in populated areas. In addition our investigations have shown that this carbon monoxide represents a potentially valuable source of heat although its economic recovery obviously presents difficulties since the carbon monoxide is present in only very low concentrations in extremely large volumes of high velocity hot flue gases. Aside from requirements for direct process heat, high temperature steam represents the most useful and important form of heat in an oil refinery. Our invention provides a system for effecting complete combustion of carbon monoxide contained in waste flue gases from catalytic cracking units and for efficient and economic recovery of the heat values represented by the carbon monoxide in the form of high temperature steam, and we have devised a burner for burning low concentrations of carbon monoxide in a high velocity gas stream which is specially adapted for converting the potential heat values of the carbon monoxide to recoverable values and for elimination of atmospheric pollution. The new burner is characterized by an elongated muffle tube combustion chamber in which extraneous fuel is burned to supply preheat for the combustion of the carbon monoxide in the waste flue gases, an annular chamber surrounding the muffle tube combustion chamber in which the waste flue gases are preheated by heat transfer from the internal muffle tube combustion chamber, means for introducing the waste flue gases into the annular chamber in the portion of the chamber near the fuel-air inlet of the muffle tube combustion chamber, a mixing register set in the end of the annular chamber connecting with the end portion of the muffle tube combustion chamber, and an elongated furnace chamber of relatively enlarged section extending from the mixing register. Advantageously, the entry of the waste flue gases into the annular chamber is tangential so as to provide maximum rotary motion to the gases and maximum residence time within the chamber. Also, the mixing register advantageously is capable of imparting a high velocity circular motion to the flue gases leaving the annular chamber to promote intimate admixture with the combustion gases leaving the muffle tube combustion chamber. The construction of the burner is with greatest advantage in the form of a single vertically disposed outer pipe containing a carborundum refractory tube as the muffle tube combustion chamber. The section of the pipe corresponding to the annular chamber is provided with insulation for the outer wall to reduce heat losses and the furnace chamber is formed by providing a suitable refractory shell within the section of pipe above the annular chamber and internal muffle tube combustion chamber.

In the more particular aspects of our invention, useful heat in the form of high temperature steam is produced by providing a tubular steam boiler in cooperation with the elements of the burner. Thus, extraneous fuel is burned in the muffle tube combustion chamber, the combustion gases are passed in concurrent gas-to-gas heat exchange with the carbon monoxide containing flue gases in the annular chamber, the preheated flue gases are mixed with the hot combustion gases produced by burning the extraneous fuel, the carbon monoxide in the combined gas stream is burned in the furnace chamber and the resulting hot combustion gases are passed over the tubes of a waste heat boiler. Advantageously the gases are also passed through a boiler feed water economizer before being vented to the atmosphere. For spontaneous combustion of the carbon monoxide and contribution of its heat values to the large volumes of flue gases available for steam generation, the preheat supplied by direct and indirect heat exchange from the combustion of the extraneous fuel must maintain a temperature of at least about 1400° F. in the furnace chamber.

The basis for the design of our burner comes from consideration of the mechanism of combustion of low B. t. u. gas in large volumes and in high velocity streams. Flue gases from a typical catalytic cracking unit containing carbon monoxide are ordinarily available at an average temperature of about 450° F. and have the following typical analysis:

| Component: | Mol percent |
|---|---|
| $CO_2$ | 8.69 |
| $O_2$ | 3.07 |
| CO | 3.84 |
| $N_2$ | 69.62 |
| $H_2O$ | 14.78 |
| Total | 100.00 |

Under these conditions of composition and temperature the combustion of carbon monoxide will not occur spontaneously and our studies indicate that combustion will not take place until a temperature of at least 1400° F. is reached and maintained in the zone where the burning is to be effected. It is therefore necessary to supply additional heat to raise the carbon monoxide containing flue gases to that temperature. We have found that this can best be accomplished by firing an extraneous fuel in a muffle tube combustion chamber thereby heating the walls of the muffle tube, passing the carbon monoxide containing flue gases tangentially into an annular chamber surrounding the muffle tube combustion chamber to impart maximum preheat to the flue gases before they pass through the mixing register, mix with the hot combustion gases from the muffle tube, and burn in the furnace chamber. The burning of the carbon monoxide releases additional heat which tends to maintain the furnace chamber temperature. Thus large volumes of the carbon monoxide containing flue gases moving in a high velocity stream are raised to the critical temperature for the combustion of the carbon monoxide and the combustion reaction is continuous and self-sustaining.

We have determined both by heat balance and from experimental data that the quantity of extraneous fuel required to preheat the carbon monoxide bearing flue gases to 1400° F., is almost exactly equivalent in heat content to the heat released from the combustion of the carbon monoxide to carbon dioxide after making due allowance for radiation and other unaccounted heat losses. Complete study of the data collected indicates that the additional heat required is used to preheat the carbon monoxide bearing flue gases up to a temperature of 1400° F. At this point combustion of the carbon monoxide is spontaneous. If the furnace chamber temperature is allowed to fall below approximately 1250–1300° F. the carbon monoxide will no longer burn.

We will describe the construction and operation of our novel gas burner, by way of further illustration, with reference to the accompanying drawings.

The apparatus illustrated in Figure 1 comprises essentially a muffle tube 1, a conventional gas burner 2, an annular chamber 3, a mixing register 4, and a furnace chamber 5 all situated within a steel pipe 6. The muffle tube may consist of a cylindrical tube 6 inches in inside diameter, constructed of carborundum refractory. The extraneous fuel burner 2 may be any conventional burner susceptible of high rates of heat release and convenient control. By way of example, a 4 inch Maxon Ventite gas burner can be employed in which gas is supplied through line 7 and in which air is aspirated at the venturi so that single valve control is provided. Annular chamber 3 is an annular chamber surrounding the muffle tube, the outside wall of which annular chamber may be lined with plastic refractory to reduce heat losses. The mixing register 4 may be a circular vane wheel provided with small vanes at the periphery. The furnace chamber 5 located above the mixing register may be lined with plastic refractory to reduce heat losses. The steel pipe 6 may be a 20 inch diameter steel pipe. Muffle tube 1 serves as a combustion chamber for this extraneous fuel. The carbon monoxide containing flue gases are introduced tangentially at the bottom of annular zone or plenum chamber 3 by means of line 8. Excess air may be supplied by means of line 8A. The purpose of the plenum chamber 3 is to provide preheat to the incoming flue gases and the introduction of the flue gases is tangential so as to impart the maximum rotary motion to these gases to increase their residence time in the annular chamber. The preheated flue gases then pass through mixing register 4. The small vanes at the periphery of the mixing register are set at such an angle as to impart a high velocity circular motion to the flue gases leaving the annular chamber and passing into the high temperature combustion gases leaving the muffle tube. The thoroughly admixed flue gases then pass into furnace zone 5 where the carbon monoxide ignites spontaneously and is completely burned.

As stated above, aside from direct process heat, high temperature steam represents the most useful and important form of heat in an oil refinery. Where an extraneous fuel is ordinarily burned to produce such steam in a refinery, the employment of our novel burner and heat recovery system will result in substantial economic advantages. For example the potential heat represented by the carbon monoxide in the flue gases from catalytic cracking operations normally released to the atmosphere amounts to approximately 50,000,000 B. t. u. per hour. And as indicated above, the quantity of extraneous fuel required to preheat the flue gases to about 1400° F. was found to be almost exactly equivalent in heat content to the potential heat represented by the carbon monoxide in the flue gases. Thus by expending 50,000,000 B. t. u. per hour of extraneous heat, a total of 100,000,000 B. t. u. per hour is made available for recovery, i. e., where extraneous fuel is normally expended to produce heat for the production of steam, the utilization of our burner and heat recovery system permits the recovery of twice as much heat for the same amount of extraneous fuel expended with a consequent reduction in the cost of overall steam requirements.

In addition to the substantial economic advantages achieved by the utilization of our invention in the recovery of appreciable quantities of heat from the complete combustion of carbon monoxide to carbon dioxide in extremely dilute gas mixtures normally vented to the atmosphere, our invention affords other important advantages. For example, our burner can be constructed at low cost and the combustion is accomplished without the use of any catalyst or combustion promoters. Moreover the operating features of our burner are such that it can readily handle all concentrations of carbon monoxide in inert gas mixtures and can therefore be used in other installations than the catalytic cracking units and can readily be incorporated into standard boiler designs for efficient steam generation. Furthermore our burner provides a simple dependable means for removal of carbon monoxide in flue gas streams which if released to the atmosphere in large quantities near congested areas would constitute a possible air pollution problem and/or health hazard.

We claim:

1. Apparatus for burning low concentrations of carbon monoxide in large volumes of high velocity waste flue gases which comprises an elongated muffle tube combustion chamber, means for supplying to and burning in the muffle tube combustion chamber a fuel-air mixture, means forming an annular chamber surrounding the muffle tube combustion chamber, means for introducing the waste flue gases into the annular chamber in a portion of the chamber near the fuel-gas inlet of the muffle tube combustion chamber, a mixing register set in the end of the annular chamber communicating with the end portion of the muffle tube combustion chamber to intimately admix the waste flue gases with products from the muffle tube combustion chamber, and an elongated furnace combustion chamber of relatively enlarged section extending from the mixing register.

2. Apparatus for burning low concentrations of carbon monoxide in large volumes of high velocity waste flue gases which comprises an elongated muffle tube combustion chamber, means for supplying to and burning in the muffle tube combustion chamber a fuel-air mixture, means forming an annular chamber surrounding the muffle tube combustion chamber, means for introducing the waste flue gases into the annular chamber tangential to the muffle tube combustion chamber in a portion of the chamber near the fuel-gas inlet of the muffle tube combustion chamber, a mixing register set in the end of the annular chamber communicating with the end portion of the muffle tube combustion chamber to intimately admix the waste flue gases with products from the muffle tube combustion chamber, and an elongated furnace chamber of relatively enlarged section extending from the mixing register.

3. An apparatus for burning low concentrations of carbon monoxide in large volumes of high velocity waste flue gases which comprises a vertically situated refractory lined elongated pipe, a refractory muffle tube vertically situated inside of said pipe and in the central lower portion thereof, said muffle tube providing a combustion chamber, an annular chamber between said muffle tube and said pipe, a furnace combustion chamber inside said pipe and above the muffle tube, a mixing register set in the end of the annular chamber within the pipe communicating with the upper end of the muffle tube combustion chamber and the lower end of the furnace combustion chamber, said mixing register being capable of imparting a high velocity circular motion to a stream of carbon monoxide containing waste flue gases from the annular chamber and passing said waste flue gases into a stream of combustion gases from the muffle tube combustion chamber and passing the combined streams of gases into the furnace combustion chamber, means for tangentially introducing a stream of carbon monoxide containing waste flue gases into the lower portion of the annular chamber, and means for supplying to and burning in the muffle tube combustion chamber a fuel-air mixture.

References Cited in the file of this patent

UNITED STATES PATENTS

| | | |
|---|---|---|
| 1,172,755 | Wilson | Feb. 22, 1916 |
| 1,603,760 | Furkert | Oct. 19, 1926 |
| 1,719,684 | Besta | July 2, 1929 |
| 1,857,364 | Rachat | May 10, 1932 |
| 1,857,447 | Engels | May 10, 1932 |
| 1,958,913 | DeCoriolis et al. | May 15, 1934 |
| 2,081,697 | Falla | May 25, 1937 |
| 2,336,833 | Badenhausen | Dec. 14, 1943 |

FOREIGN PATENTS

| | | |
|---|---|---|
| 434,106 | Germany | Sept. 18, 1926 |
| 259,044 | Great Britain | Oct. 7, 1926 |
| 620,813 | France | Jan. 24, 1927 |